UNITED STATES PATENT OFFICE.

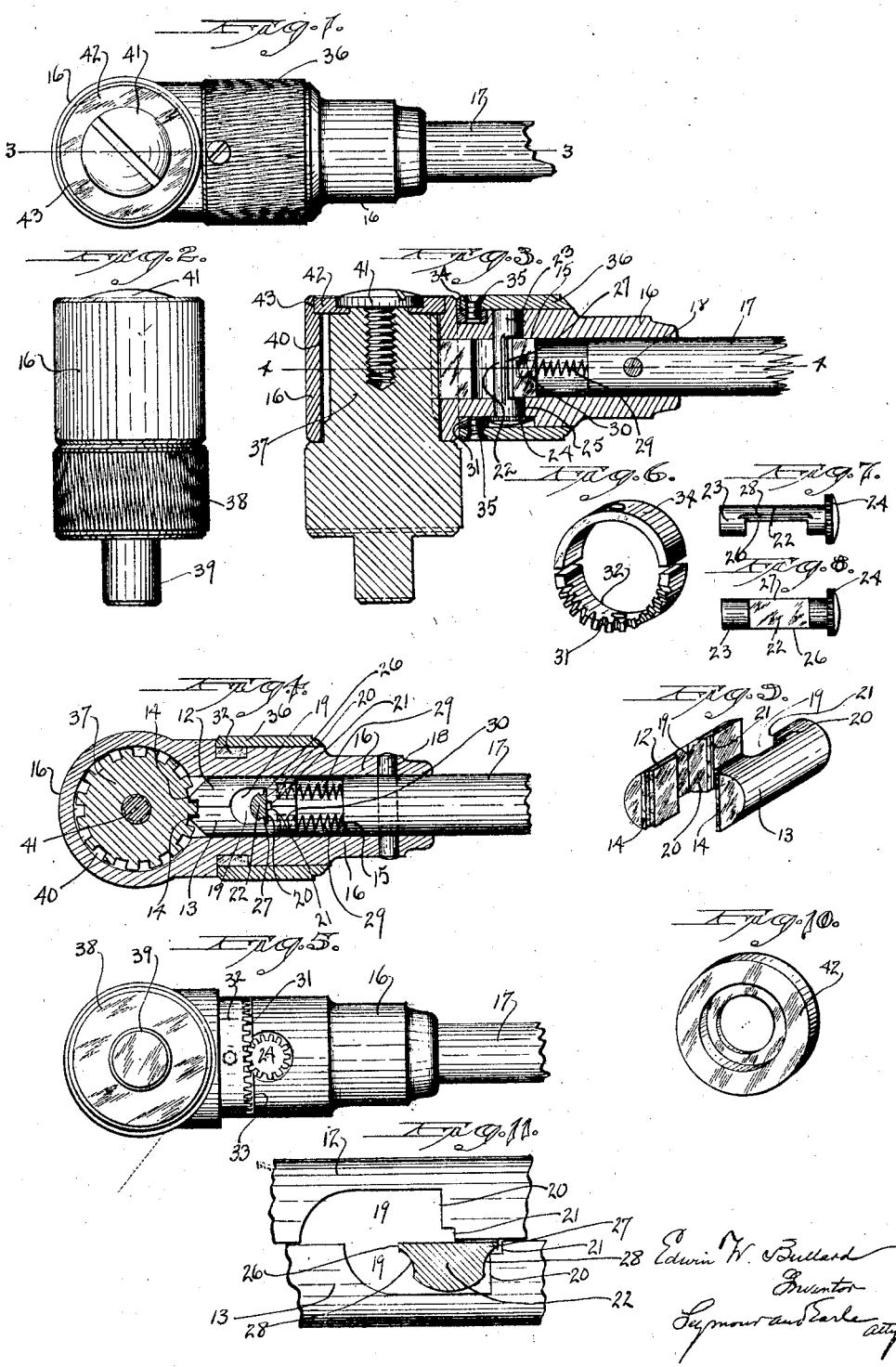

EDWIN W. BULLARD, OF WHITNEYVILLE, CONNECTICUT, ASSIGNOR TO WINCHESTER REPEATING ARMS CO., OF NEW HAVEN, CONNECTICUT, A CORPORATION.

RATCHET MECHANISM.

1,388,926.      Specification of Letters Patent.      Patented Aug. 30, 1921.

Application filed September 13, 1920. Serial No. 409,858.

*To all whom it may concern:*

Be it known that I, EDWIN W. BULLARD, a citizen of the United States, residing at Whitneyville, in the county of New Haven and State of Connecticut, have invented a new and useful Improvement in Ratchet Mechanisms; and I do hereby declare the following, when taken in connection with the accompanying drawings, and the characters of reference marked thereon, to be a full, clear, and exact description of the same, and which said drawings constitute part of this application, and represent, in—

Figure 1. A broken view of my improved ratchet mechanism.

Fig. 2. A view thereof of front elevation.

Fig. 3. A broken view thereof in central longitudinal section on the line 3—3 of Fig. 1.

Fig. 4. A corresponding view in horizontal section on the line 4—4 of Fig. 3.

Fig. 5. A broken plan view in partial assembly.

Fig. 6. A detached perspective view of the two-part annular rack.

Fig. 7. A detached plan view of the pinion with its slotted stem.

Fig. 8. A view thereof as turned a quarter turn.

Fig. 9. A perspective view showing the two sliding pawls.

Fig. 10. A perspective view of the assembling washer.

Fig. 11. An enlarged detached broken view partly in plan and partly in section of the pawls and the operating-stem, showing the engagement of one of the auxiliary shoulders of the stem with the secondary shoulder of the retracted pawl for yieldingly locking the same in its retracted position.

My invention relates to an improved ratchet-mechanism of the sliding pawl type, designed for use in bit-stocks, wrenches and kindred structures, the object being to provide a simple, compact, reliable and effective mechanism constructed with particular reference to utilizing the full diameter of the pawls for engagement with the teeth of the ratchet.

With these ends in view my invention consists in a ratchet-mechanism having semi-cylindrical longitudinally slidable matched pawls the flat inner faces of which are located in the plane of the axis of the ratchet and the noses of which are parallel to the same plane. My invention further consists in a ratchet-mechanism having certain details of construction and combination of parts, as will be hereinafter described and pointed out in the claims.

In carrying out my invention as herein shown, I employ a pair of complementary, semi-cylindrical, longitudinally slidable, matched pawls 12 and 13, the flat inner faces of which are located in the plane of the mechanism, represented by the line 3—3 of Fig. 1. The noses 14 of the pawls are parallel with this plane and therefor correspond in length to the full diameter of the pawls.

These pawls are located and have sliding movement in a cylindrical bore 15 concentric with the axis of the housing 16, the outer end of the said bore receiving the crank lever 17 which is secured in place by a transverse pin 18.

The inner faces of the said pawls are formed with complementary notches 19 (Fig. 11) the forward ends of which are rounded while their inner ends are formed with square operating shoulders 20, the corners of which are notched to form auxiliary shoulders 21. The said notches 19 receive the semi-cylindrical central portion 22 of the stem 23 of a pinion 24 bearing in a transverse hole 25 formed in the housing 16 so as to intersect at a right-angle, the forward portion of the bore 15. The corners 26 and 27 of the part 22 of the stem 23 respectively co-act with the shoulders 20 of the pawls for the independent retraction thereof, while grooves 28, formed in the rounded surface of the part 22 co-act with the auxiliary shoulders 21 of the pawls as clearly shown in Fig. 11 to yieldingly hold the pawls in their retracted positions.

Interposed between the rear ends of the pawls and the forward end of the crank lever 17 are helical pawl springs 29 the forward ends of which enter holes 30 formed in the rear ends of the pawls as shown in Fig. 4, the pawls being alternately retracted by the turning of the stem 23 against the tension of these springs.

For rotating the stem 23 its pinion 24 is meshed into by the teeth 31 of the semi-circular rack 32 occupying one-half of a circumferential groove 33 formed in the housing 16 the other half of this groove being occupied by a semi-circular filler 34. The said rack 32 and filler 34 are secured by screws 35 to a knurled sleeve 36 encircling the middle portion of the housing 16 and provided for the operation of the pawls.

The noses 14 of the pawls engage throughout their length with the teeth of a ratchet 37 of ordinary construction, this ratchet being formed at the upper end of a chuck-head 38 having a chuck-mounting stem 39. The ratchet 37 is located within a chamber 40 formed in the outer end of the housing at a right-angle to the bore 15 thereof. The ratchet and hence the chuck-head are held in place by a screw 41 entering the ratchet, and by a retaining washer 42 fitting into a rabbet 43 concentric with the hole 40 and formed in the upper face of the housing.

By turning the sleeve 36 in one direction or the other the rack 32 correspondingly turns the stem 23 which thus effects the retraction and locking of one or the other of the two pawls against the tension of its spring while by turning the sleeve to bring the central portion 22 of the stem 23 into a line at a right-angle to the pawls both of the same are forced by their springs into position to engage with the ratchet so as to prevent the same from being turned in either direction.

By organizing my improved ratchet-mechanism so that the flat inner faces of the pawls are located in the plane of the axis of the ratchet, the outward thrust of the ratchet-teeth upon the noses of the pawls effects the utilization of the entire semi-cylindrical outer surfaces of the pawls in their bearing upon the housing, whereby wear and all tendency to jam is reduced to the minimum, as compared with ratchet-mechanisms employing semi-cylindrical matched pawls arranged with their flat surfaces at a right angle to the plane of the axis of the ratchet, causing the thrust-resisting contact between the pawls and the walls of the housing to lie along the edges of the pawls.

I claim:

1. A ratchet-mechanism having a housing formed with a cylindrical ratchet-chamber, and a cylindrical pawl-chamber located at a right angle thereto; a ratchet located in the ratchet-chamber, a pair of longitudinally slidable semi-cylindrical matched pawls positioned in the pawl-chamber so that their flat faces lie in the plane of the axis of the ratchet, and means for independently operating the pawls, whereby the noses of the pawls substantially correspond in length to the diameter of the pawls, and whereby all torsional strain upon the pawls is prevented.

2. A ratchet-mechanism having a ratchet, a housing therefor, a pair of semi-cylindrical, matched, longitudinally slidable, contacting, spring-actuated pawls, the flat inner faces of which are formed with primary shoulders notched to produce auxiliary shoulder, a rotary stem cut transversely to form two operating-corners respectively co-acting with the said primary shoulders of the pawls for the independent operation thereof, and the said operating-corners being flanked with grooves respectively co-acting with the said auxiliary shoulders of the pawls.

3. A ratchet-mechanism having a ratchet-housing, a ratchet, a pair of longitudinally slidable contacting pawls engaging with the said ratchet, means for independently operating the said pawls, including a semi-circular rack, a pinion engaged by the said rack and a stem turning with the pinion and co-acting with the pawls for their independent retraction from the ratchet.

4. A ratchet-mechanism comprising a ratchet-housing, a ratchet, a pair of longitudinally slidable contacting pawls co-acting with the said ratchet, a semi-circular rack mounted in the said housing, a pinion engaged by the said rack, a stem turning with the pinion and co-acting directly with the said pawls for retracting the same independently of each other, and means mounted upon the said housing and connected with the said rack for operating the same to independently retract the pawls.

5. A ratchet-mechanism having a ratchet, a housing therefor, a pair of longitudinally slidable contacting pawls engaging with the said ratchet, a semi-circular rack, a pinion engaged by the said rack, a stem turning with the pinion and co-acting directly with the said pawls for their independent retraction, and a sleeve mounted upon the housing and connected with the said rack.

6. A ratchet-mechanism having a ratchet, a housing therefor, a pair of complementary semi-circular contacting pawls sliding one upon the other and engaging with the said ratchet, a semi-circular rack turning upon the housing, means for turning the said rack, a pinion engaged by the rack, and a stem turning with the pinion and transversely cut to form two operating corners respectively co-acting directly with the said pawls for their independent operation.

In testimony whereof, I have signed this specification in the presence of two subscribing witnesses.

EDWIN W. BULLARD.

Witnesses:
 ERIK S. PALINE,
 A. E. HODGSON.